United States Patent Office 3,698,922
Patented Oct. 17, 1972

---

3,698,922
DOLOMITIC REFRACTORY
Ronald Staut, Cherry Hill, N.J., and George G. Judd, Woodville, Ohio, assignors to General Refractories Company, Philadelphia, Pa.
No Drawing. Filed Apr. 13, 1970, Ser. No. 28,040
Int. Cl. C04b 35/06
U.S. Cl. 106—58
18 Claims

ABSTRACT OF THE DISCLOSURE

A dolomitic refractory which is produced by calcining dolomite to produce quicklime; slaking the quicklime under atmospheric pressure with at least 80 percent by weight of water until the quicklime comprises by weight on an oxide basis about 3 to 40 percent magnesium oxide; forming the slaked quicklime into a suitable refractory shape; and then sintering the shaped material to produce a refractory.

---

This invention relates to dense dolomitic refractories which exhibit significantly improved refractoriness and hydration stability.

Dead-burned or sintered dolomitic refractories prepared by high temperature calcination and sintering of dolomitic ores are used extensively in the steel industry for the repair of the hearth linings of basic electric and open-hearth furnaces. In addition, such refractories often comprise the working linings of converters in the oxygen conversion process for the production of steel. These refractories are also quite widely utilized in the lining of rotary kilns for the rock products industry. Because of these uses, there has been a continuing interest with respect to the finding of means whereby the properties of such refractories could be improved.

In the prior art dolomitic refractories were most often prepared by mixing various fluxing agents with the raw dolomite prior to dead-burning or sintering. By fluxing agents is meant materials such as iron oxide, clays, silica and the like. The addition of these fluxing agents tends to improve hydration resistance while also lowering the temperatures necessary for sintering. However, the presence of such fluxing agents also has a deleterious effect on the refractoriness and particularly the density of the resulting product. Consequently, flux-containing dolomitic refractories are often inadequate to meet the demands of present day steel making processes, especially the above-mentioned oxygen conversion process wherein considerably higher temperatures are utilized to obtain greater melting and refining rates.

Of course, another means for the preparation of dolomitic refractories involves admixing dolomite with pieces of coke and sintering such admixtures in shaft kilns. The combustion of the coke furnishes the heat necessary for sintering. The principal disadvantage of this process lies in the fact that the residual ash from the coke adds to the impurities in the final dead-burned product. Consequently, as in the case of the addition of fluxing agents, the products produced by this process lack sufficient refractoriness for present day uses. Accordingly, various means have been sought whereby dolomitic refractories could be prepared without the necessity of incorporating impurities of any kind.

One such means is disclosed in U.S. Pat. 3,304,188 to Basic Incorporated. This patent teaches calcining dolomite to produce dolomitic quicklime which is an intimate mixture of calcium oxide and magnesium oxide. Thereafter, the quicklime is hydrated under pressure until the calcium and magnesium contents thereof are fully hydrated. The fully hydrated quicklime is formed into a suitable refractory shape and then sintered or dead-burned until the desired refractory article is obtained. This process does, of course, render it possible to prepare dolomitic refractories without the addition of fluxing agents. However, as indicated, the dolomite must be fully hydrated and such hydration requires the use of pressure. As a consequence, this process necessitates the use of special equipment such as, for example, an autoclave. The use of this and similar equipment is expensive and time consuming. It follows, of course, that the economics of this process are not very favorable. Furthermore, the dead-burned dolomitic refractories obtained thereby often lack sufficient density and hydration stability.

This invention provides a high purity dolomitic refractory which exhibits improved density and hydration stability. Furthermore, this invention provides an economical process for the preparation of such dolomitic refractories without the addition of fluxing agents. Specifically, the dolomitic refractory of this invention is produced by a process which comprises: calcining dolomite to produce quicklime; slaking the quicklime under atmospheric pressure with at least 80 percent by weight of water until the quicklime is partially hydrated; forming the partially hydrated quicklime into a suitable refractory shape; and then sintering the shaped partially hydrated quicklime to produce a refractory.

The dolomitic refractories of the present invention may be prepared from most commercially available dolomite rock comprising in the range of at least about 97 percent by weight CaO·MgO. However, it is especially preferable to employ a high purity dolomite rock, that is, one comprising in the range of at least about 99 percent CaO·MgO. For example, the Niagaran type found in Northwestern Ohio is a particularly useful dolomite for this invention.

Calcination of the dolomite is ordinarily achieved by subjecting such to a temperature in the range of about 900 to 1500° C. Preferably, the dolomite will be calcined at a temperature in the range of about 1000 to 1400° C. The time required for calcination will vary with the temperature. Ordinarily, this will be in the range of about one-half to two hours.

Any suitable kiln can be utilized for calcination of the dolomite. Typically, this will be a shaft or rotary kiln. Of course, regardless of the type of kiln employed, the fuel should be selected on the basis that such does not introduce excessive amounts of impurities into the calcined product. With rotary kilns, coals of moderate or low ash content and gas or fuel oil are most commonly utilized. As indicated heretofore, shaft kilns which come in various types, can also be employed for the calcination of dolomite. One such type is known as an Arnold kiln which is heated by means of coal fired dutch ovens opening into the lower part of the kiln. On the other hand, Azbe type shaft kilns are fired with producer or natural gas.

As might be expected, the size of the dolomite stone to be calcined is immaterial since this will vary depending upon the particular kiln being utilized. Consequently, the dolomite sizing should be selected on the basis of the most efficient and economical use of the kiln.

As is well known, calcination of the raw dolomite stone, as described heretofore, results in the production of quicklime. This product, that is, the quicklime, is then slaked under atmospheric pressure with at least 80 percent by weight of water until the quicklime is partially hydrated. By the term "partially hydrated" is meant that the quicklime has been converted to a mixture comprising calcium hydroxide, magnesium hydroxide and magnesium oxide. Specifically, partially hydrated quicklime in accordance with this invention will comprise by weight on an oxide basis in the range of about 3 to 40 percent magnesium oxide. Preferably, the partially hydrated quicklime will comprise by weight in the range of about 5 to 20 percent magnesium oxide. The balance of the partially hydrated quicklime will, of course, be a combination of calcium hydroxide and magnesium hydroxide. As previously noted, the quicklime is partially hydrated in accordance with this invention by slaking said quicklime in water under atmospheric pressure wherein the water is present in an amount so as to constitute at least 80 percent by weight of the quicklime. Generally, and preferably, the water will be present in an amount so as to constitute in the range of about 100 to 150 percent by weight of said quicklime.

Hydration of the quicklime at greater than atmospheric pressure will result in the elimination of the magnesium oxide component. Without the magnesium oxide component, the dolomitic refractories would resemble those of the prior art; thus the desirable characteristics of the present invention would not be obtained.

The partial hydration of the quicklime in accordance with this invention is ordinarily completed in about 2 to 72 hours. Preferably, the desired level of hydration will be achieved in about 5 to 10 hours. Of course, on occasion partial hydration of the quicklime will be accomplished in less than 2 hours or may require more than 72 hours. In any event, determination of the desired level of hydration in accordance with this invention falls within the scope of ordinary analytical chemical methodology.

Subsequent to partial hydration, as set forth heretofore, the resulting material is formed into a refractory shape suitable for sintering. For example, the hydrated quicklime may be nodulized, extruded or pressed into pellets or briquettes. Forming of the hydrated quicklime will ordinarily involve a pressing operation utilizing conventional equipment capable of supplying sufficient pressure to give a strongly coherent dense refractory shape. Either hydraulically or mechanically actuated presses are acceptable. Pressures in the range of about 4,500 to 10,000 p.s.i. have been found to be satisfactory, although higher pressures ranging up to approximately 30,000 p.s.i. may be used. In some instances the higher pressures are preferable in order to obtain stronger refractory shapes possessing better resistance to abrasion during handling.

These formed refractory shapes may be stored or immediately sintered. However, it has been found that the refractory shapes actually tend to harden and become stronger if they are permitted to cure for approximately 24 hours after forming.

Before a refractory shape can be utilized as a true dolomitic refractory, such must be sintered, that is, dead-burned. Sintering or dead-burning of the formed refractory may take place in any suitable rotary or shaft kiln which is capable of supplying the desired high temperatures. As previously noted, the fuel utilized for firing the kiln may be natural gas, fuel oil, powdered coal or any other acceptable fuel. The use of natural gas or fuel oil is preferred since these fuels do not introduce additional impurities into the product, such as often occurs when coal is employed.

The dead-burning or sintering time varies, of course, with the sintering temperature. As might be expected, less sintering time is necessitated at higher temperatures. For example, it has been found that exposure of a refractory shape for approximately 20 to 25 minutes at about 1700° C. produces a sintered dolomitic refractory possessing relatively high density. Generally, the sintering temperature will be in the range of about 1300 to 1800° C. and preferably 1500 to 1700° C.

After sintering, the resulting refractory may be employed in that form or by using conventional means pressed into brick shapes and tempered. Most often, the dolomitic refractory grains will be coated with pitch before they are pressed into shape.

The many facets of this invention are further illustrated by the following examples which are not to be construed as limitations thereof. On the contrary, resort may be had to various other embodiments, modifications and equivalents of these examples which readily suggest themselves to those skilled in the art without departing from the spirit of the present invention and/or the scope of the appended claims.

EXAMPLES 1–9

Three batches of Niagaran dolomite were calcined for two hours in the laboratory at 1000, 1200 and 1400° C. respectively. The resultant quicklime from each batch was then slaked in water at atmospheric pressure for 5 hours, the water being present in the amount of 150 percent by weight of the quicklime. The slaked quicklime comprised on an oxide basis 5.35, 11.32 and 13.35 percent magnesium oxide respectively. This material was then dried and pressed into disks at 10,000 p.s.i. with 10 percent water as a binder. Disks from each of the batches were then fired at 1500, 1600 and 1700° C. for two hours.

Table I sets forth the bulk density and porosity of each such fired product.

TABLE I

| Example number | Calcination temperature | Firing temperature | Bulk density, g./cc. | Porosity, percent |
|---|---|---|---|---|
| 1 | 1,000 | 1,500 | 3.38 | 0.131 |
| 2 | 1,000 | 1,600 | 3.36 | 0.05 |
| 3 | 1,000 | 1,700 | 3.35 | 0.02 |
| 4 | 1,200 | 1,500 | 3.38 | 0.04 |
| 5 | 1,200 | 1,600 | 3.39 | 0.05 |
| 6 | 1,200 | 1,700 | 3.39 | 0.05 |
| 7 | 1,400 | 1,500 | 3.39 | 0.08 |
| 8 | 1,400 | 1,600 | 3.39 | 0.05 |
| 9 | 1,400 | 1,700 | 3.39 | 0.04 |

As is apparent from the above data, the dolomitic refractory so produced exhibits a very high bulk density and a low porosity, both highly desirable qualities.

EXAMPLE 10

A pilot plant run was made utilizing raw dolomite with the following chemical analysis:

$CaCO_3$ ---------------------------------------- 54.59
$MgCO_3$ ---------------------------------------- 44.80
$SiO_2$ ------------------------------------------ 0.27
$Fe_2O_3$ ---------------------------------------- 0.045
$Al_2O_3$ ---------------------------------------- 0.17

This dolomite was then calcined in a rotary kiln at 1315° C. The resultant quicklime was slaked with water in a pug mill under atmospheric pressure, said water being present by weight in the amount of 150 percent by weight of the quicklime. After slaking for 2 hours, the resulting paste-like material had an MgO content of 9 percent by weight on an oxide basis. The partially hydrated quicklime was then fed to a rotary chain dryer which removed all but 10 to 15 percent of the moisture and produced a nodulized product. These nodules were further air dried and then fed to a rotary kiln with a hot zone temperature of 1600 to 1650° C. The resulting dolomitic refractory grain had a density of 3.33 g./cc. and a grain sizing as follows:

Mesh:                              Accumulative percent
  +2½ ---------------------------------------- 28.1
  +3 ------------------------------------------ 45.1
  +4 ------------------------------------------ 65.8
  +6 ------------------------------------------ 77.6
  +8 ------------------------------------------ 87.5
  +10 ----------------------------------------- 94.4
  +14 ----------------------------------------- 98.4
  Through 14 --------------------------------- 1.6

Using conventional procedures these dolomitic refractory grains were then mixed with heated 110° C. pitch containing 2 percent by weight of carbon black. After mixing, the grains were pressed at 12,500 p.s.i. into 9 inch straights and then tempered by heating. The resulting refractory bricks were evaluated as follows:

| | |
|---|---|
| Bulk density, g./cc. | 2.91 |
| Modulus of rupture, p.s.i. | 980 |
| Cold crushing strength, p.s.i. | 3265 |
| Compressive strength at 300° F., p.s.i. | 425 |
| Coking test ASTM: | |
|    Bulk density | 2.82 |
|    Modulus of rupture, p.s.i. | 410 |
|    Retained carbon, percent | 4.80 |
| Porosity, open percent: | |
|    As made | 4.1 |
|    After coking | 10.3 |
|    After ignition | 16.9 |

We claim:

1. A process for producing dolomitic refractory which comprises: calcining dolomite to produce a quicklime; slaking the quicklime under atmospheric pressure with at least 80 percent by weight of water until the quicklime is partially hydrated and contains about 3 to 40 percent magnesium oxide and balance substantially calcium hydroxide and magnesium hydroxide; forming the partially hydrated quicklime into a suitable refractory shape; and then sintering the shaped partially hydrated quicklime to produce a refractory.

2. A process according to claim 1 wherein the partially hydrated quicklime will comprise by weight on an oxide basis in the range of about 5 to 20 percent magnesium oxide.

3. A process according to claim 1 wherein the water will be present in an amount so as to constitute in the range of about 100 to 150 percent by weight of the quicklime.

4. A process according to claim 1 wherein the dolomite comprises at least 97 percent by weight CaO·MgO.

5. A process according to claim 1 wherein the dolomite comprises at least 99 percent by weight CaO·MgO.

6. A process according to claim 2 wherein the water will be present in an amount so as to constitute in the range of about 100 to 150 percent by weight of the quicklime.

7. A process according to claim 6 wherein the dolomite comprises at least 97 percent by weight CaO·MgO.

8. A process according to claim 6 wherein the dolomite comprises at least 99 percent by weight CaO·MgO.

9. A process according to claim 7 wherein the dolomite is calcined at a temperature in the range of about 900 to 1500° C.

10. A process according to claim 9 wherein the dolomite is calcined at a temperature in the range of about 1000 to 1400° C.

11. A process according to claim 10 wherein the quicklime is slaked in water for about 5 to 10 hours.

12. A process according to claim 11 wherein the shaped partially hydrated quicklime is sintered at a temperature in the range of about 1300 to 1800° C.

13. A process according to claim 12 wherein the partially hydrated quicklime is sintered at a temperature in the range of about 1500 to 1700° C.

14. A process according to claim 1 wherein the dolomitic refractory is pressed into a pitch bonded brick.

15. A process according to claim 1 wherein the partially hydrated quicklime is nodulized.

16. A process according to claim 1 wherein the partially hydrated quicklime is pressed into briquettes.

17. The process of claim 16 in which the partially hydrated quicklime is dried and contains about 10 percent water when it is pressed into briquettes.

18. The process of claim 15 in which the hydrated quicklime is fed to a rotary chain dryer which removes all but 10–15% of the moisture and produces nodules.

References Cited

UNITED STATES PATENTS

| | | | |
|---|---|---|---|
| 3,304,188 | 2/1967 | Hughey | 106—58 |
| 3,070,449 | 12/1962 | Davies et al. | 106—63 |
| 3,026,211 | 3/1962 | Cutler | 106—58 |
| 3,276,882 | 10/1966 | Buntenbach et al. | 106—63 |
| 3,397,070 | 8/1968 | Paul et al. | 106—58 |

JAMES E. POER, Primary Examiner

U.S. Cl. X.R.

106—61, 63